United States Patent [19]

Seto

[11] Patent Number: 5,193,173

[45] Date of Patent: Mar. 9, 1993

[54] METHOD AND DEVICE FOR STORING DATA SUBJECTED TO DISPERSION PROCESSING

[75] Inventor: Yoichi Seto, Hadano, Japan

[73] Assignee: Hitachi, Ltd., Tokyo, Japan

[21] Appl. No.: 428,878

[22] Filed: Oct. 30, 1989

[30] Foreign Application Priority Data

Nov. 2, 1988 [JP] Japan .................................. 63-278408

[51] Int. Cl.[5] ............................................ G06F 12/00
[52] U.S. Cl. ................................ 395/425; 364/724.12; 382/42
[58] Field of Search ... 364/200 MS File, 900 MS File, 364/724.12, 728.01; 382/42; 395/325, 425, 275

[56] References Cited

U.S. PATENT DOCUMENTS 4,048,485 9/1977 Nussbaumer ............... 364/724.12 X
4,118,784 10/1978 Nussbaumer .................. 364/724.12
4,797,923 1/1989 Clarke ......................... 364/724.12 X

FOREIGN PATENT DOCUMENTS 60-24647 of 0000 Japan .

OTHER PUBLICATIONS

"Memory", The Institute of Electronics and Communication Engineers of Japan, vol. 67, No. 11, 1984, pp. 1134-1145, English translation unavailable to applicant's attorney.

Primary Examiner—Thomas M. Heckler
Attorney, Agent, or Firm—Fay, Sharpe, Beall, Fagan, Minnich & McKee

[57] ABSTRACT

A data storing device for storing data subjected to dispersion processing is disclosed, in which input data are subjected to a dispersion processing by a convolution operation of the input data with a dispersion function, and dispersed data thus obtained are stored so that the initial input data are restored to be retrieved by the convolution operation of the dispersed data with the inverse function of the dispersion function.

24 Claims, 10 Drawing Sheets

| ADDRESS NUMBER | NUMBER OF RETRIEVALS | NUMBER OF REDUCTIONS |
|---|---|---|
| 0 | 1 | 1 |
| 10 | 50 | 0 |
| 20 | 30 | 0 |
| 30 | 33 | 0 |

∗ : CONVOLUTION OPERATION

METHOD AND DEVICE FOR STORING DATA SUBJECTED TO DISPERSION PROCESSING

BACKGROUND OF THE INVENTION

The present invention relates to a method and device for storing data so that it is strengthened against bit errors produced in memory cells by dispersing the stored data in a memory device so as to be suitable for use in an environment, where radiation conditions are bad, such as space, nuclear reactors, etc. It relates further to a data dispersion type memory method suitable for a work memory for image or aural data, etc., in which the amount of the data that is accessed only a relatively small number of times, is reduced so that the memory area for new input data is secured automatically.

Of this kind of prior art memory devices, there is known a semiconductor memory device disclosed e.g. in Journal of Electronic Communication Society of Japan (in Japanese), Vol. 67, No. 11, pp. 1134–1145 (1984). In this device, as indicated in FIG. 1, one input data set (write-in information) 14 is stored in a memory cell 16 in the memory device, i.e. in a memory cell matrix 13 selected by an address information 10, an address register 11 and a decoder 12 with a one-to-one relation. A retrieved data set (read-out information) 15 is, similarly to the storing, retrieved from a memory cell 16 in the memory cell matrix 13 selected by the address information 10, the address register 11 and the decoder 12.

The prior art memory device described above has the problem that since the stored input data and the memory place are in a one-to-one relation, in the case where information stored in a specified memory cell is destroyed by influences of radiation, etc., it is impossible to restore the information.

Further such a prior art memory device has another problem that since no attention is paid to the frequency of use of the stored data, when the amount of the stored data reaches the limit of the memory capacity, a part of the data could be erased artificially. For solving this problem a proposal has been made of an autonomous resources management system with recorded evolutions of system performance with scheduler control including a knowledge learning function in a computer system in JP-A-Sho 60-24647. By this method job management data is utilized for utilizing efficiently resources of the computer system. It is necessary therefor to store management data generated time-sequentially to manage the system efficiently.

By this method it is proposed that when new job management data different from the stored job management data is generated, all information of the data stored in an old data storing region is erased, depending on the frequency of use of the stored data, in order to secure an input data area, and new data is stored in the storing region stated above.

However the method described above has still another problem that no attention is paid to the case where a renewed retrieval is required for the data once erased.

That is, the prior art techniques described above have serious problems that;
(1) it is difficult to retrieve and restore deficient data, and
(2) data occupies the memory capacity, independently of the importance thereof.

SUMMARY OF THE INVENTION

The object of the present invention is to provide a data storing method and a device for realizing same capable of solving the problems described above in the prior art techniques, restoring deficient data and at the same time effecting memory management based on actual results of use.

The above object of the present invention can be achieved by a data storing device having a memory portion for storing input data, characterized in that a data dispersion input processing portion is provided, which executes a convolution operation for the input data with a dispersion function to calculate how the data is dispersed and then to store it in the memory portion. A retrieval and restoring processing portion is also provided, which executes a convolution operation of the dispersed data in the memory portion for its retrieval in response to a retrieval demand to thereby retrieve the stored data. The retrieval function is an inverse function of the dispersion function. Further, for dispersed stored data, for which the frequency of the retrieval is small, the dispersed data at the proximity of an end is erased little by little on the basis of a convolution operation thereof with a data decreasing function with an intention to use the memory efficiently.

According to the present invention the following effects are obtained.
(1) Even in the case where a part of data in the storing portion is destroyed by external perturbation, since data is stored dispersedly, it is possible to restore it by executing a convolution operation thereof with a predetermined retrieval function.
(2) Although the amount of data, for which the relative number of accesses is small, is reduced (forgotten); since that data is stored dispersedly, even if the amount of data is reduced in some degree, it can be restored and retrieved. Due to this partially forgetting function, the amount of data is reduced automatically and a new data storing area is secured. In this way the memory device is never unable to write-in new data and it is possible to manage efficiently the memory device.

In conclusion, according to the present invention, a data storing device can be realized, by which it is possible to restore data in spite of a deficiency occurring and at the same time to effect a memory management based on actual results of data use.

DESCRIPTION OF THE PREFERRED EMBODIMENTS

Figure 1:
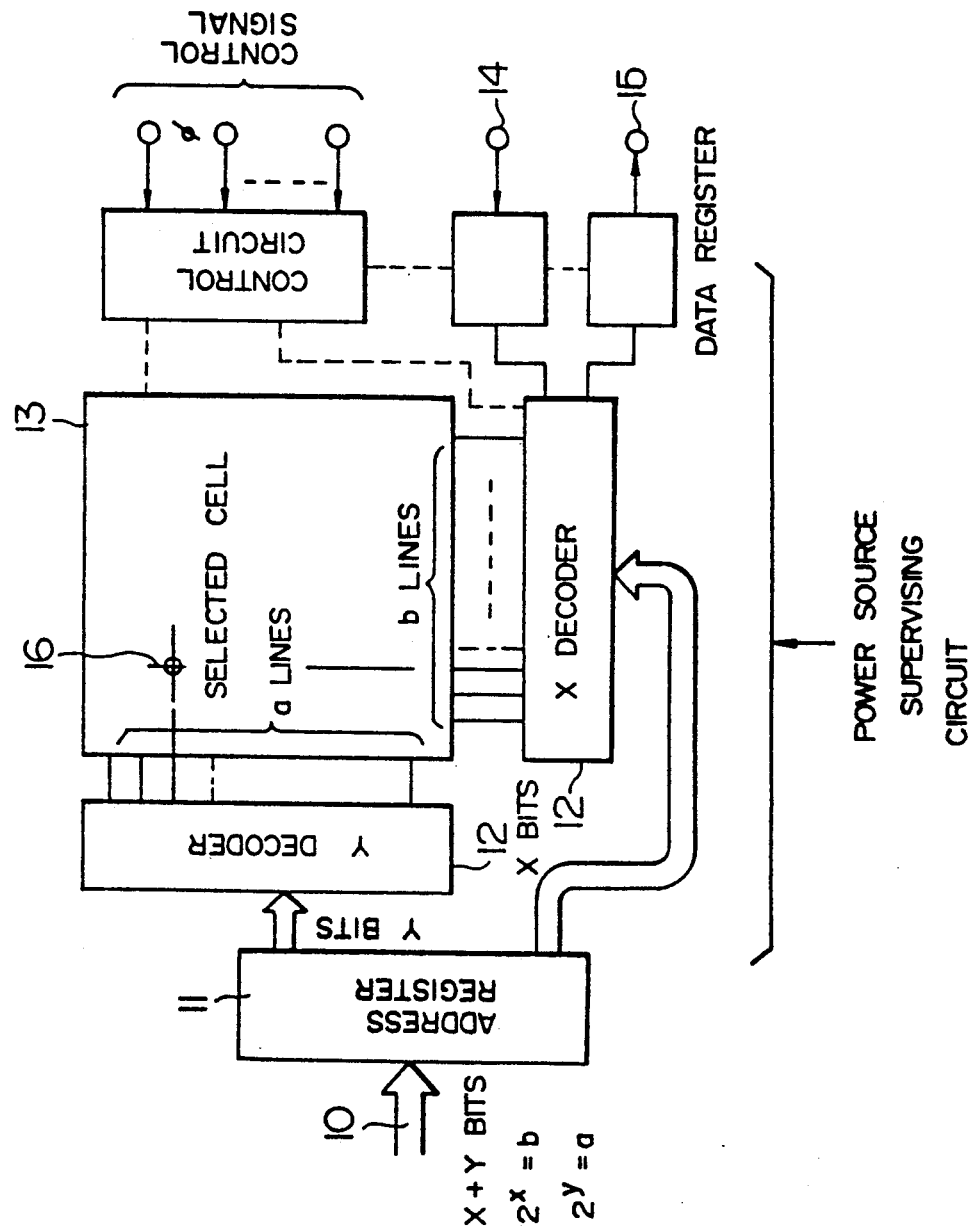
FIG. 1 is a scheme indicating the outline of a prior art memory device.
Figures 2A, 2B:
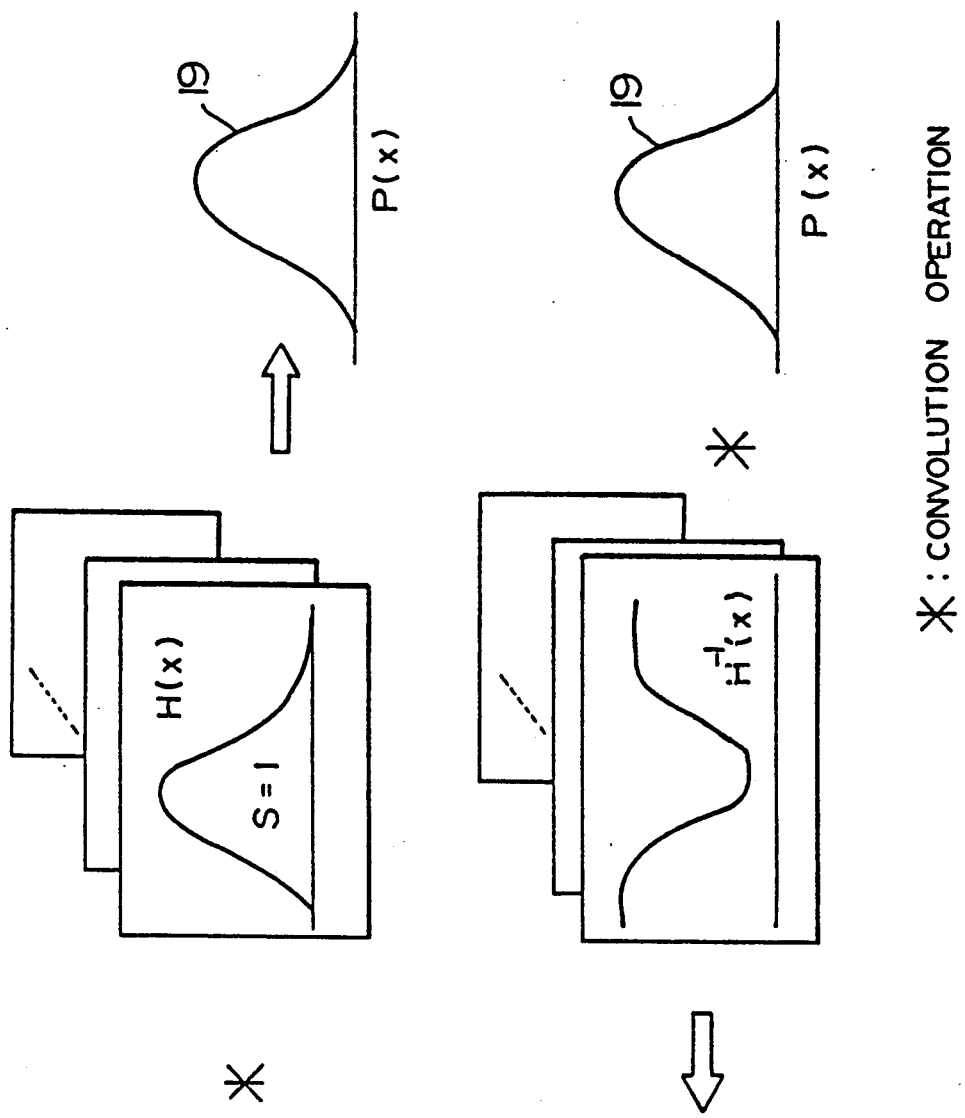
FIG. 2 shows schemes indicating the principle of the present invention.

FIG. 2 shows the principle of operation of the present invention.

For a pulsed input data I(x) having an area 1 representative of a signal value, a convolution operation with a dispersion function H(x) having an area 1 is executed so as to obtain dispersion data P(x) also having an area 1, as follows;

$$P(x) = \sum_{h=1}^{u} I(x)H(h - x)$$

The pulsed data is transformed into data as wide as the dispersion function by this dispersion processing at the storing, the address being assigned to the abscissa and the memory capacity to the ordinate, the amplitude of the dispersion data P(x) is memorized. In other words, the data can be converted from a pulse value to a set of values capable of being dispersed in a corresponding set of memory cells in a memory when stored therein.

In the case where the dispersion data P(x) is retrieved so as to obtain the initial input data I(x) in the form of Î(x), a convolution operation of the dispersion data P(x) with the inverse function $I^{-1}=1/H$ of the dispersion function H(x) is executed so as to obtain the retrieved data Î(x), i.e.

$$I(x) = \sum_{h=1}^{u} P(x)H^{-1}(h - x)$$

The number of dispersion functions H(x) is not restricted to one, but a plurality of dispersion functions, which are orthogonal to each other, i.e. in the relation of vector inner product=0, are prepared.

If the dispersion processing is effected by using dispersion functions, which are in the orthogonal relation with each other, even if memory areas are overlapped when storing the dispersed data, it is possible to retrieve distinct data values separately from each other.

Figure 3:
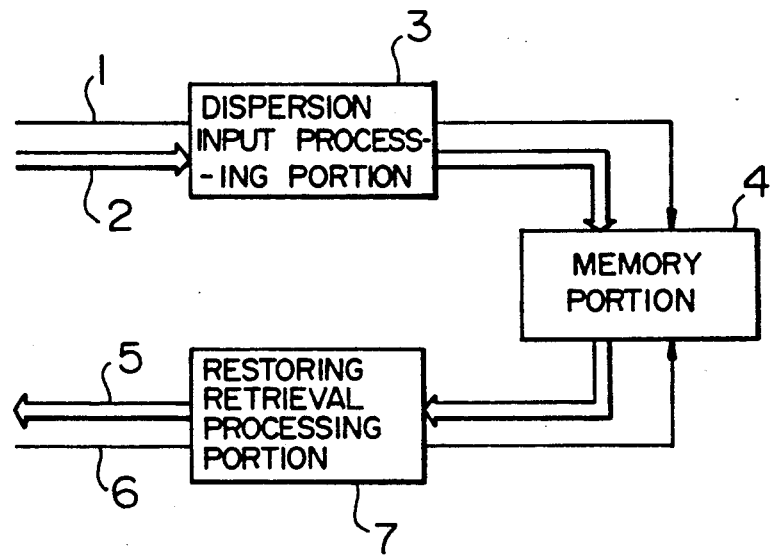
FIG. 3 illustrates an embodiment of the data storing device according to the present invention.

FIG. 3 shows the outline of the data storing device according to the present invention, which comprises a dispersion input processing portion 3 dispersing input data 2, a memory portion 4 storing the dispersed data and a restoring retrieval processing portion 7 that retrieves and restores the data stored dispersedly in the memory portion 4 for thereby obtaining the retrieved data. In this case the address of the dispersed data in the memory portion 4 is determined by stored address information 1 and retrieved address information 6. The dispersion input processing in the dispersion input processing portion 3 transforms the input data (I) 17 into the dispersed data (P) 19 (FIG. 2) by means of a dispersion function and stores it in the memory portion 4. The dispersion input processing can be realized by using Eq. (1)

$$P(x) = \sum_{i=1}^{n} H(x - i\Delta x) \cdot I(i\Delta x) \quad (1)$$

where H is a transmission function of a linear system, when the dispersion storing processing is considered as a linear system, and corresponds to an impulse response function; $\Delta x$ is a data sampling interval; i is an integer; and the function H is e.g. a Gaussian distribution function having a deviation of o expressed by Eg.(2) or a trigonometrical function which can be used therefor. A plurality of the used dispersion functions are orthogonal to each other.

$$H(x) = exp(-2\pi^2\sigma^2 x^2) \quad (2)$$

Figure 4:
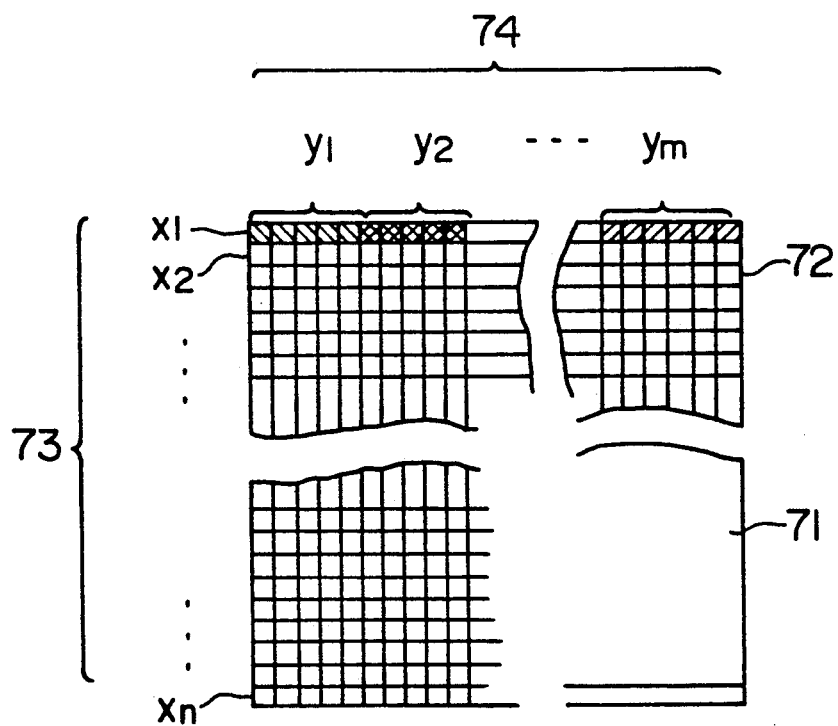
FIG. 4 illustrates an embodiment of the memory portion in the embodiment.

FIG. 4 shows a concrete example of the memory portion 4. The dispersed data is not stored in only a single memory cell 72 in a two-dimensional memory 71, but it is stored dispersedly in a set of cells $Y_1, Y_2, \ldots, Y_m$ in the y address direction. The address indicating the storage position specifies address information in the two-dimensional memory (x address and y address), e.g. as address $x_1$ 73, $y_1$ 74.

Next the restoring retrieval of the data from the memory portion 4 can be realized by means of Eq. (3)

$$I(x) = \sum_{i=1}^{n} H^{-1}(x - i\Delta x) \cdot P(i\Delta x) \quad (3)$$

where $H^{-1}$ represents the inverse function of H and Î the retrieval output data 5 indicated in FIG. 3. The restored retrieval data (Î)21 is obtained for the dispersed data (P)19 indicated in FIG. 2(b) by the restoring retrieval processing in the restoring retrieval processing portion 7.

Figure 5:
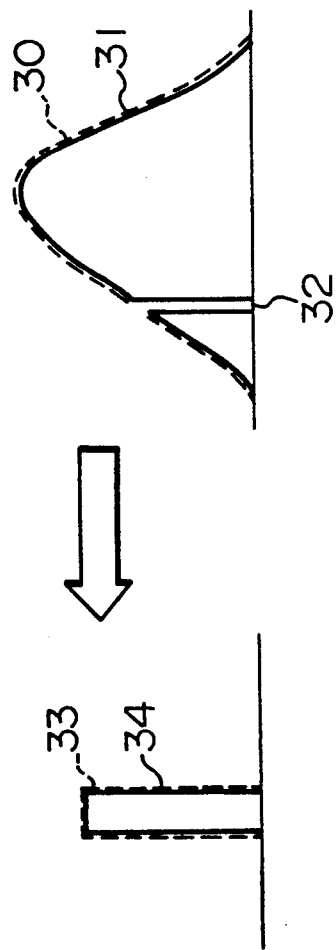
FIG. 5 is a scheme indicating the principle of the restoration and retrieval of deteriorated data.

Since the restoring retrieval processing indicated by Eq. (3) gathers data dispersed in the memory portion 4, even if a part of the data is deteriorated, the initial data can be restored in some degree by associated memory. That is, due to the fact that the data is stored, dispersedly in the memory, even if a part of the memory is destroyed, all the stored data is usually not lost and the remaining parts can be used to restore the data. For example, denoting the data obtained by restoring retrieving the dispersed data 30, which is not deteriorated, by 33 and the data obtained by restoring retrieving the dispersed data 31, for which a partial memory cell destruction 32 has taken place 32, by 34, as indicated in FIG. 5, since corresponding information of the input data is stored dispersedly, even if a part of the data is deteriorated, the initial data can be restored in the retrieval result. By this feature of the invention, it can be seen that it is a memory method that is particularly strong against noise problems.

Figure 6:
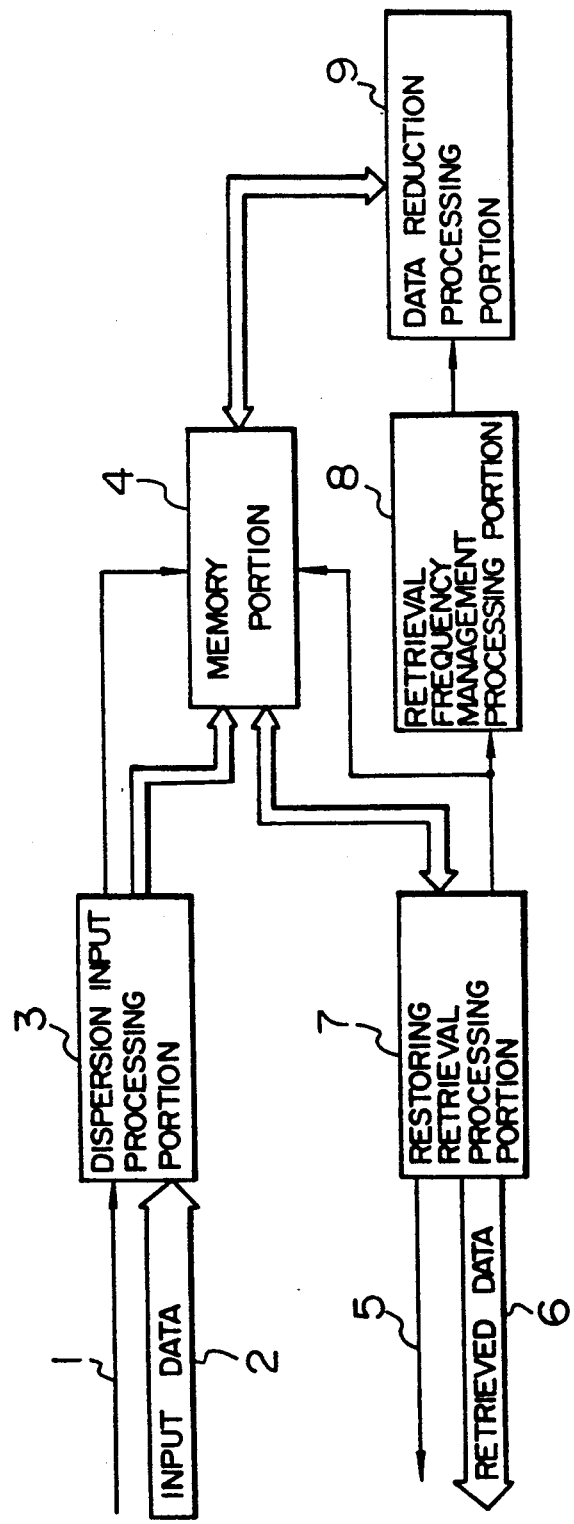
FIG. 6 illustrates another embodiment of the data storing device according to the present invention.

With regard to the memory management feature which is based on the actual data use results, as indicated in FIG. 6, a device is useful in which a retrieval frequency management processing portion 8 and a data reduction processing portion 9 are added to the construction of the dispersion type memory device indicated in FIG. 3. It can be seen that this is, so to speak, a device, in which the forgetting function for data whose frequency of use is small, is added to the storing function.

In this device the number of accesses to each of the addresses for the stored data is managed on the basis of the address information 6 in the retrieval frequency management processing portion 8. Further, in the data reduction processing portion 9, the amount of data is reduced according to Eq. (4) for the data, for which the relative number of accesses is small, in order to continue to have a useable margin in the memory capacity, by using Eq. (4);

$$P'(x) = P(x) \cdot W(x) \tag{4}$$

where P(x) indicates the amount of stored data; W(x) is the data reduction function for reducing the stored data; and P'(x) is the stored data reduced in the amount of data. For the data reduction function W(x) a function is set which is small in value at the two ends and great at the center. That is, the W(x) is such that the weight for the data will be smaller with increasing distance from the center. For this reason, even if the data reducing processing is executed, the amount of information does not vary rapidly. As the data reduction function W(x), e.g. a Hanning window indicated by Eq. (5) is used;

$$W(x) = \{1 - \cos(2\pi x)\}/2 \tag{5}$$

The multiplication processing, by which the stored data P(x) is multiplied by the data reduction function W(x), means that the data dispersion values are relatively erased in an order from the ends of the dispersed data (as illustrated in the Figures by curve 19) towards the center.

Figure 7:
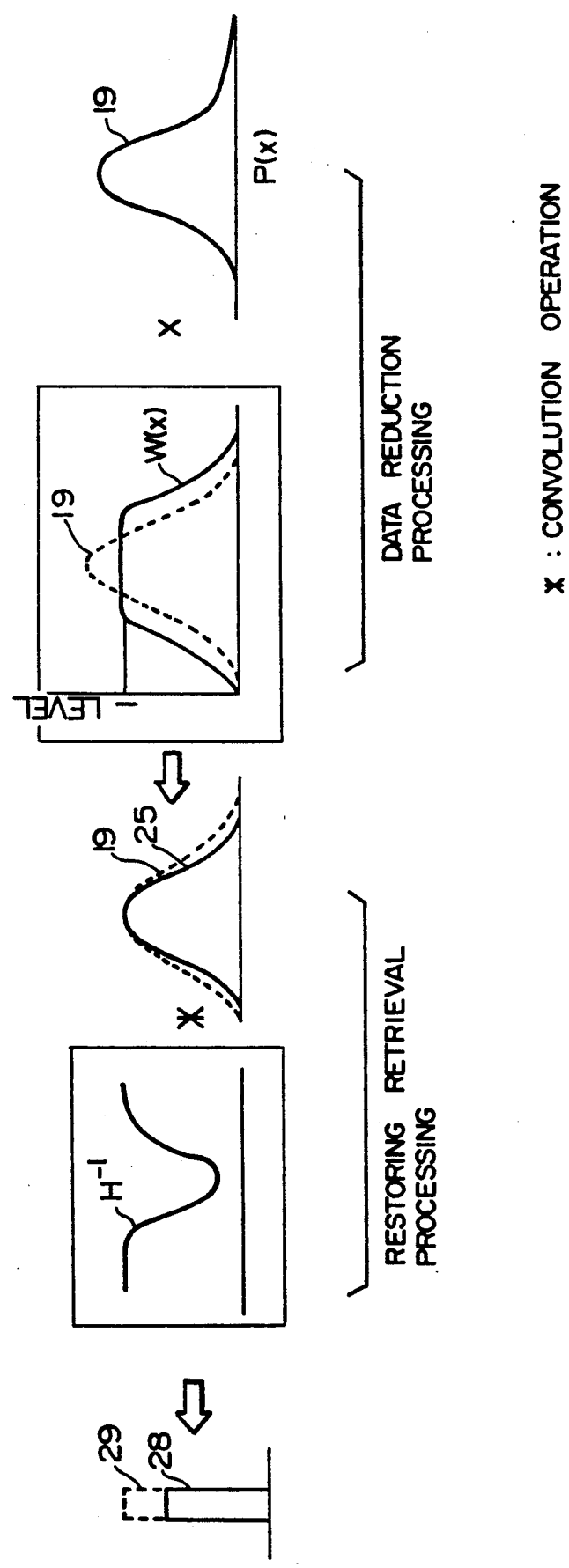
FIG. 7 is a scheme indicating the principle of the data reducing processing.

As indicated in FIG. 7, the amount of data is reduced, starting from the end portions, where data values are of less importance because the amount of information of the stored data (P)19 is little. The data reduction processing is selectively effected for certain predetermined number of accesses.

Here it is supposed that data is more important with increasing number of accesses. If the number of accesses is identified and managed in the retrieval frequency management processing portion 8, the importance of the data can be obtained. In particular, the data having a low frequency of use can be identified by managing the number of accesses.

As indicated in FIG. 7, when the data reduction is effected for the stored data (P)19, from Eq. (4) P'(iΔx) = P(iΔx)·W(iΔx) is performed so that the reduced stored data (P')25 is obtained. When the restoring retrieval processing is executed on this stored data (P')25 after the data reduction, substituting P'(iΔx) for P(iΔx) in Eq. (3), $$I'(x) = \sum_{i=1}^{n} H^{-1}(x - i\Delta x) \cdot P'(i\Delta x) \tag{6}$$

$$I(x) \approx I'(x) \tag{7}$$

are valid functions. However, when the frequency of use is high and the number of the data reduction processings is small, no remarkable information deterioration takes place for the retrieved data 28, which is obtained from the reduced data, with respect to what should be the retrieved data 29. However, when the processing expressed by Eq. (4) is repeated several times, Eq. (7) may become invalid. That is, this means that the degree of the "forgetfulness" stated above is advanced.

In the case where there is a plurality of dispersion functions and restoring retrieval functions, the dispersion functions, which disperse to process already overlapped stored data, should be orthogonal to each other. As the result, the restoring retrieval functions, which are inverse functions of specified dispersion functions, are orthogonal to the specified dispersion functions. For example, in the case where dispersion functions $h_1$ and $h_2$ are made act on two sets of input data $f_1$ and $f_2$, respectively, the data F in the memory portion is expressed as Eq. (8);

$$F = h_1 * f_1 + h_2 * f_2 \tag{8}$$

where * represents a convolution operation. Next, in the case where the dispersion data $f_1$ is retrieved, the restoring retrieval function $h_1^{-1}$ is made to act on Eq. (8). Here the dispersion functions $h_1$ and $h_2$ as well as $h_2$ and $h_1^{-1}$ are orthogonal to each other.

$$\begin{aligned} F * h_1^{-1} &= (h_1 * f_1 + h_2 * f_2) * h_1^{-1} \\ &= h_1 * h_1^{-1} * f_1 + h_2 * h_1^{-1} * f_2 \\ &= f_1 \end{aligned} \tag{9}$$

In this case, if the dispersion function $h_2$ and $h_1^{-1}$ are orthogonal to each other, since the result of their convolution operation (corresponding to the vector inner product), $h_2 * h_1^{-1} = 0$ and the overlapped data can be retrieved without mutual interference. Further, if data sets adjacent to each other are stored with dispersion functions orthogonal to each other, they can be stored without mutual interference and taken out separately from each other.

Figure 12:
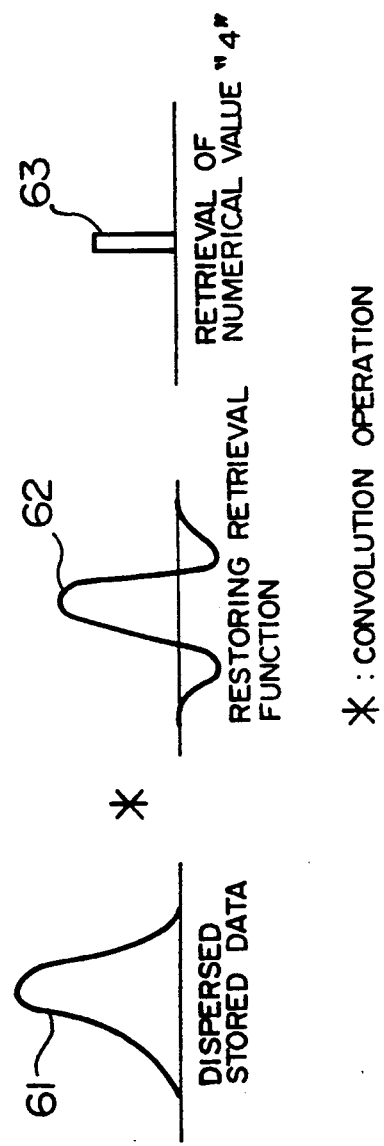
FIG. 12 indicates a restoring retrieving processing.

In the following description a one-dimensional memory, in which numerical information is stored and the amount of data of low importance is reduced in order to secure the area for storing new input data, will be explained, referring to FIGS. 8 and 12.

(1) Storing of Data

Figure 8:
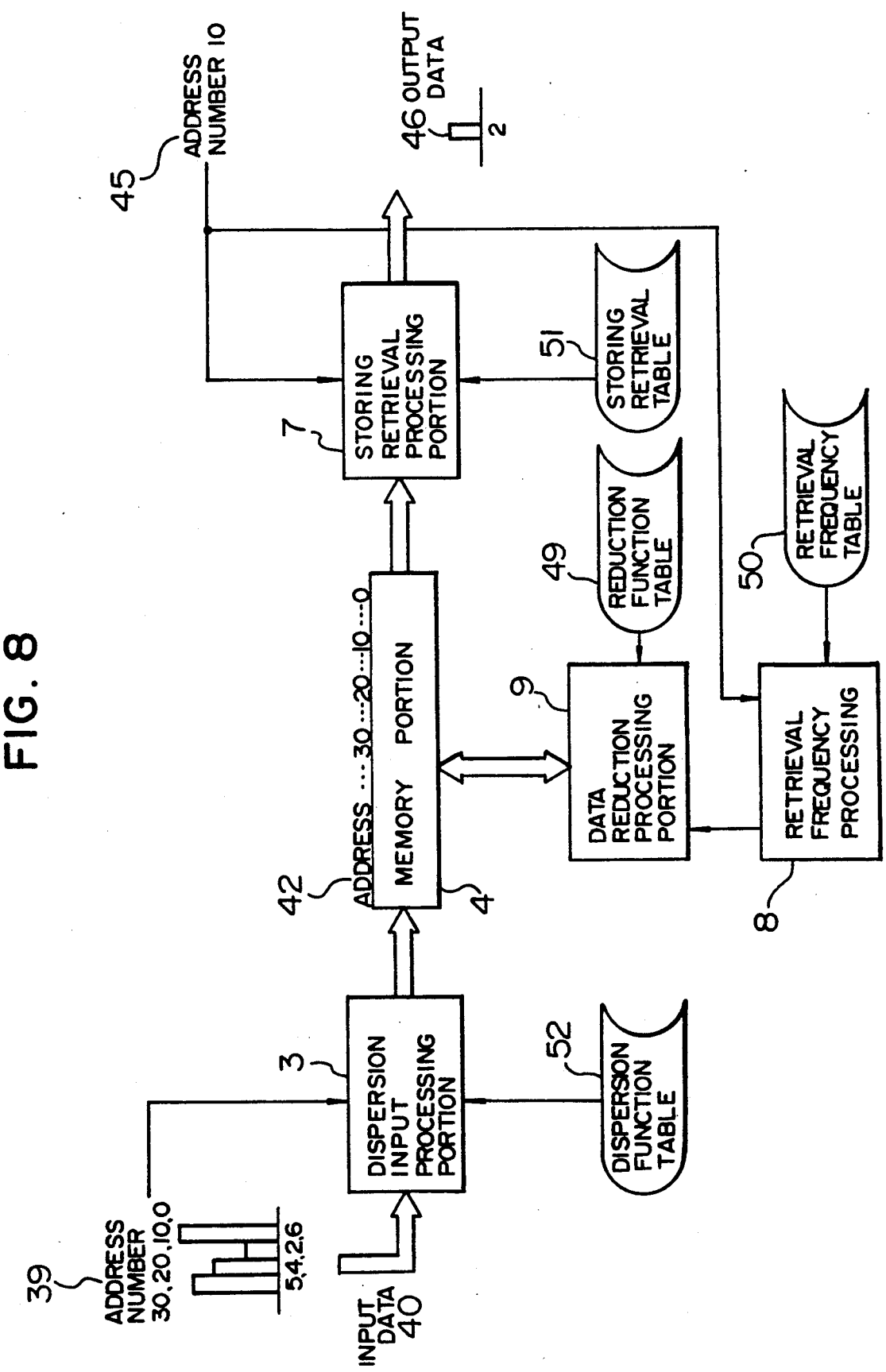
FIG. 8 is a scheme illustrating the construction of a aural data storing device having a forgetting function.

Aural data, etc. is assumed for the input data 40 indicated in FIG. 8. The input data consists of successive numerical data "6", "2", "4", "5", . . . , . Each of the numerical values is dispersed by the dispersion input processing portion 3 described previously and stored in the memory portion 4 as stated above. Here it is supposed that the memory portion 4 is defined with a one-dimensional address. The position, where the data is stored, is determined by the address information 39. For example, the numerical value "6" is stored around an address number "0" and the numerical value "2" around an address number "10".

Figures 9, 10:
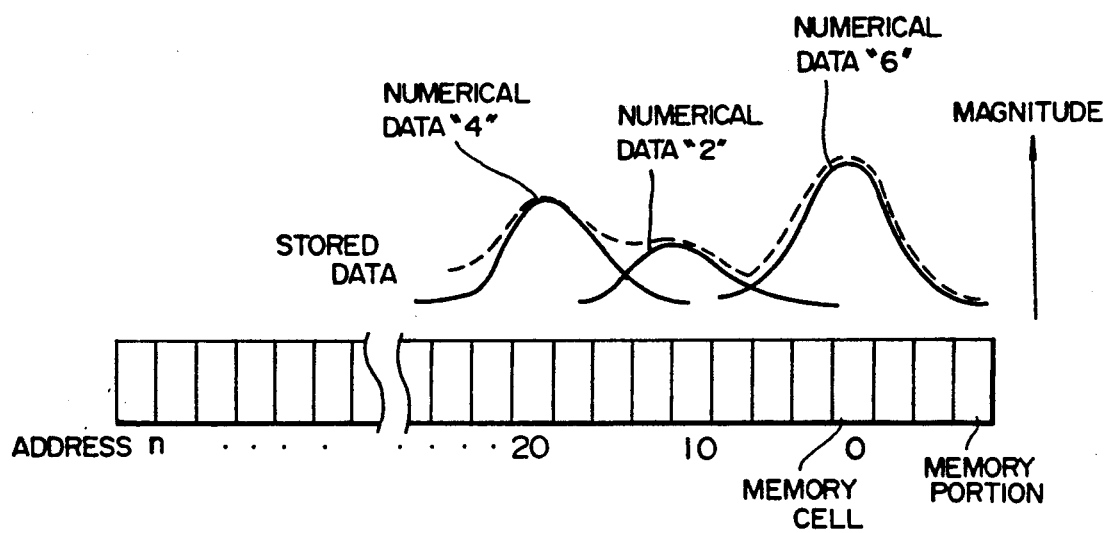
FIG. 9 is a scheme showing a memory image of dispersed data in the memory portion.
FIG. 10 is a scheme showing the construction of a retrieval frequency control table.

The dispersion storage pattern of the result of the dispersion input processing described above is shown in FIG. 9. As indicated in FIG. 9, e.g. the numerical data value "6" is stored around the address "0", dispersed in memory cells in the memory portion. The dispersed stored data are the sum of the data sets (indicated by a broken line in the figure).

(2) Management of Retrieval Frequency of Data and Reduction of Data Amount

Figure 11:
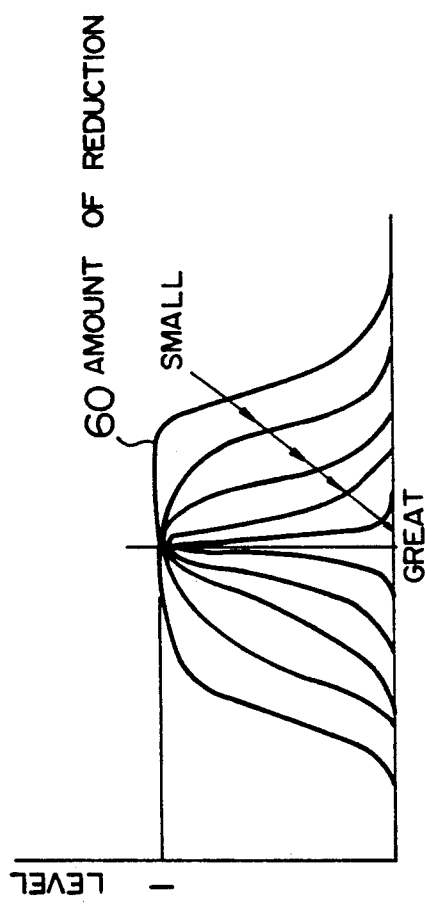
FIG. 11 is a scheme for explaining a data reducing function.

In the present embodiment the number of accesses is managed by the number of the address in the retrieval frequency management processing portion 8. For example, it is supposed that the address number "0" is retrieved only once per unit time and the other address numbers are retrieved several times, as indicated in FIG. 10. Such a retrieval frequency is recorded in a retrieval frequency table 50. The retrieval frequency table 50 consists of an address number column 57, a column of number of retrievals 58 and a column of number of data reductions 59. For the memory portion 4 the data reduction processing is executed for every unit time in the data reduction processing portion 9. As indicated in FIG. 11, the data reduction processing is selectively executed by the column of number of data reductions 59 by providing a suitable reduction function 60 from the reduction function table 49 (refer to FIG. 8). Functions, which are orthogonal just as the dispersion functions, are set in this reduction function table 49. The data reduction processing is executed by multiplying the stored data at the address number specified by the retrieval frequency processing portion 8 by a reduction function, as indicated by Eq. (4).

(3) Data Retrieval

The output data 46 (refer to FIG. 8) is retrieved from the memory portion 4 by executing storing retrieval processing. The memory position is determined by the address information 45. In the case where e.g. a numerical data value "4" is retrieved among the numerical data "6", "2", "4", "5", ... stored in the memory portion 4, the data stored in the memory portion 4 is selected by random access by specifying the address number "10" corresponding to the numerical data value "4". The retrieval can be effected by executing the convolution operation expressed by Eq. (3), selecting a restoring retrieval function 62, which is the inverse function of the dispersion function used at the input, from the restoring retrieval function table 51 and making it act on the dispersed stored data 61.

(4) Overlapped Input

In the case where the input of a new data set is required, if there remain areas, which are not yet occupied, in the memory portion 4, the data may be dispersed to be stored at the corresponding address, similarly to the data storing processing (1) described above. If no unoccupied areas remain, the data is overlapped by input into a region made available by the data amount reduction. At effecting the overlapped input, functions, which are orthogonal to each other, are used, for the dispersion functions for the already stored data and the data, which is stored later.

According to the present invention, when storing numerical data the data is stored after being dispersed by using a specified function. Thus, even if different data sets are inputted, overlapped in a same area, the retrieval of the dispersed data can be effected by using the inverse function of the dispersion function. Data of low importance in the storing region can be automatically reduced in order to secure not yet occupied areas.

Now an embodiment of a two-dimensional memory, in which data of low importance is reduced automatically in order to secure areas for storing new input data, will be explained, referring to FIGS. 13 and 14. The basic construction is the same as that indicted in FIG. 8 and the difference consists in that since the data are two-dimensional, each of the functions has 2 variables and each of the tables and the processings is prepared for 2 variables.

(1) Data Storage

Figure 13:
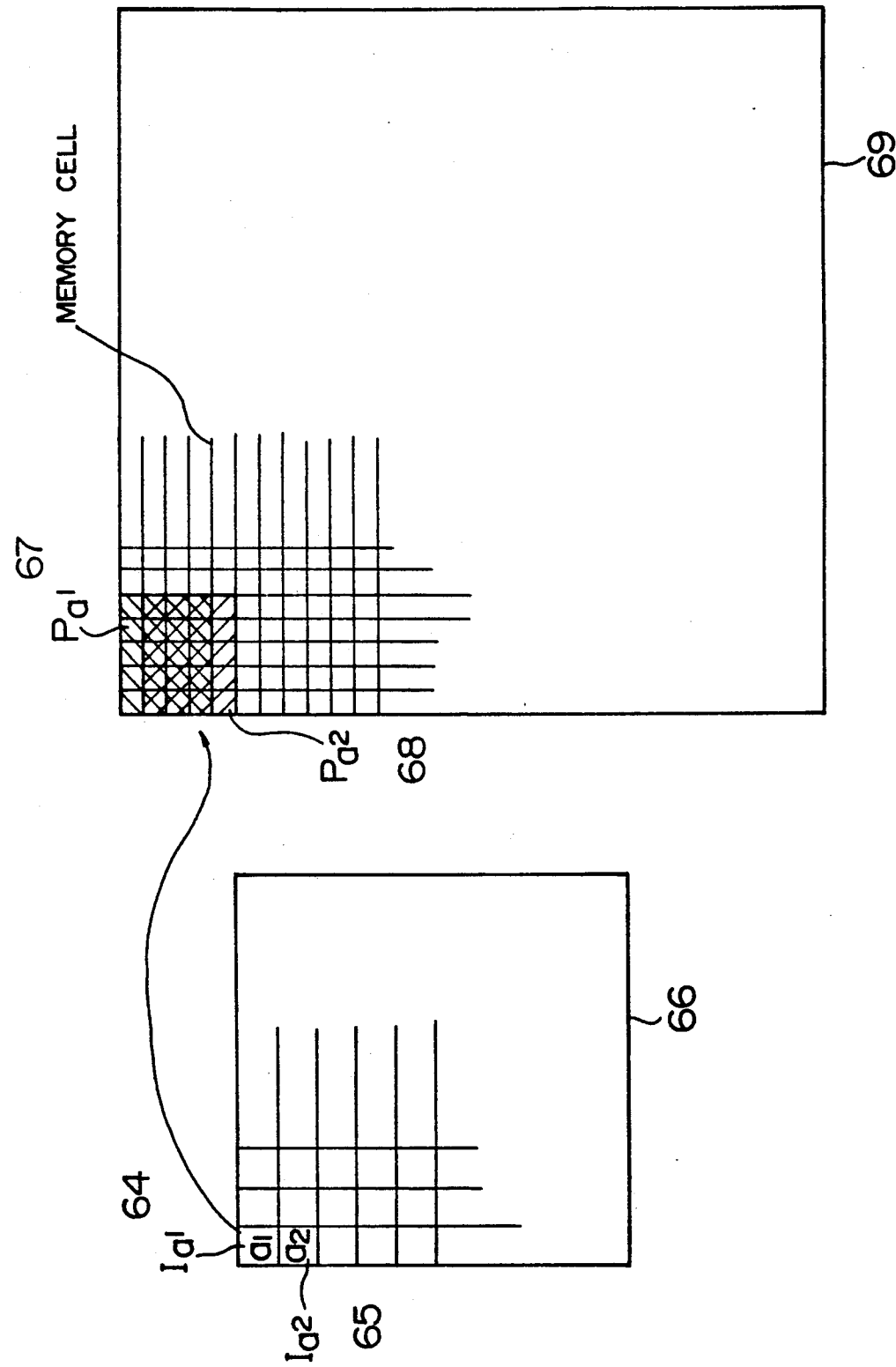
FIG. 13 illustrates an image of dispersed memory of image data.

The input data is image data 66, as indicated in FIG. 13. For example, in the case where a pixel ($I_{a1}$) 64 of a₁ is stored, an operation of Eq. (1) as stated previously may be executed in the two-dimensional form. That is, the dispersed input data ($P_{a1}$) 67 are given by;

$$P_{a1}(x,y) = \sum_{i=1}^{n} \sum_{j=1}^{n} H(x - i\Delta x, y - j\Delta y) \cdot I_{a1}(i\Delta x, j\Delta y) \quad (11)$$

The dispersed input data ($P_{a2}$) 68 of a pixel ($I_{a2}$) 65 of a₂ adjacent to a1 are identical thereto. Since the storing areas for the dispersed stored data sets ($P_{a1}$) 67 and ($P_{a2}$) 68 are adjacent to each other in the memory portion 69, their dispersed data values are overlapped to be stored.

(2) Data Retrieval Frequency Management and Data Amount Reduction

The number of accesses can be identified and managed by using the address number for the image data stated above. This is basically identical to that described in the embodiment for the one-dimensional memory stated previously. This differs therefrom in that contrary to the fact that an address is determined for a numerical data set in the embodiment of the one-dimensional memory, one image is managed by using two addresses in the x and y directions for the image data.

For the data reduction processing, the operation expressed by Eq. (4) is executed for all the data of one image data set (A) 80 in the memory portion 69 and it can be represented by Eq. (12);

$$P'(x,y) = P(x,y) \cdot W(x,y) \quad (12)$$

where the reduction function W(x,y) is a function obtained by expanding the one-dimensional reduction function W(x) to the two-dimension.

(3) Data Retrieval

Figure 14:
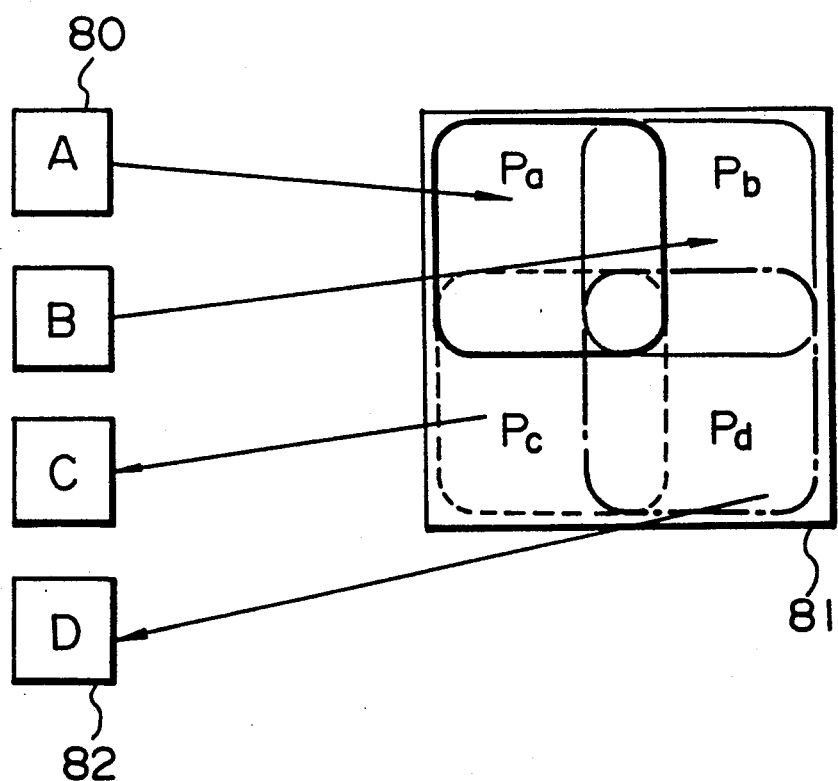
FIG. 14 illustrates an image of overlapped dispersed memory of image data.

The output data (D) 82 in FIG. 14 is retrieved by the restoring retrieval processing from the memory portion 81. The retrieval position is determined by the address information. For example, it is possible to select the data in the memory portion 81 by specifying the address number corresponding the image data stored in the memory portion 81. Further the restoring retrieval function $H^{-1}$ having characteristics, which are inverse to those of the dispersion function used at the input, is selected from the restoring retrieval table and the retrieval is effected by using the following Eq. (13);

$$I(x,y) = \sum_{i=1}^{n} \sum_{j=1}^{n} H^{-1}(x - i\Delta x, y - j\Delta y) \cdot p(i\Delta x, j\Delta y) \quad (13)$$

(4) Overlapped Input

This may be effected in the same way as that described in the embodiment of the one-dimensional memory stated above.

According to the embodiment of the two-dimensional memory, at storing image data, since the data is dispersed to be stored by using certain specified functions, even if the data is overlapped to be inputted in a same area, the dispersion retrieval of the data can be effected by using specified restoring functions and it is possible to reduce automatically data of low importance within the same memory region in order to secure an area, which is not occupied.

As another embodiment of the present invention a construction is conceivable, to which a second memory device, in which the data can be conserved for a long term, independently of the retrieval frequency of the data, is added. The second memory device is apart from the first data memory device in which the data is reduced automatically. Such an embodiment can be utilized for the management of medical information in hospitals. Chart information of patients is managed by the first memory device and chart information of patients, which has not been accessed for along time, is reduced in chronological order. However, CT image data etc. of the patients is conserved in the second memory device so that the previous state of the patients can be known, even if they come to the hospitals after a long interval.

Each of the embodiments described above shows an embodiment of the present invention and the present invention is not at all restricted thereto.

I claim:

1. A data memory means for processing input data with a dispersion process and for storing said data, comprising:
   (a) first memory means for storing one or a plurality of dispersion functions and inverse functions of said dispersion functions;
   (b) means for reading out one of said dispersion functions;
   (c) dispersion processing means for executing a first convolution operation on the input data with the one dispersion function to obtain dispersed data;
   (d) second memory means for storing the dispersed data obtained as a result of said first convolution operation;
   (e) means for retrieving said dispersed data stored in said second memory means;
   (f) means for reading out an inverse function of said dispersion function used in forming said dispersed data thus retrieved; and
   (g) restoring retrieval means for executing a second convolution operation on said dispersed at a with said inverse function thus read out and for restoring said input data from said dispersed data.

2. The data memory means according to claim 1, wherein said means for reading out the one of said dispersion functions comprises means for selecting dispersion functions, which are present in an orthogonal relationship to each other and are used for forming said dispersed data stored adjacently.

3. The data memory means according to claim 2, wherein said second memory means comprises:
   (1) means for managing the frequency of said retrieval;
   (2) third memory means for storing data reduction functions for reducing the data amount of said dispersed data; and
   (3) data reducing means for executing a processing multiplying said dispersed data by said data reduction functions on the basis of said retrieval frequency.

4. The data memory means according to claim 3, wherein said data reduction function is a function having a small value in a region in which a small amount of said dispersed data is present and having a large value in a region in which a large amount of dispersed data is present.

5. The data memory means according to claim 4, wherein said data reduction function has a value of 1 at a peak in said region in which a large amount of dispersed data is present.

6. The data memory means according to claim 3, wherein said means for managing said retrieval frequency includes means for counting the number of retrievals and said data reducing means includes means for executing said multiplying processing for data having a predetermined number of retrievals.

7. The data memory means according to claim 3, wherein said first memory means includes said dispersion function and the inverse function thereof, each of which has only one variable, said second memory means includes a one-dimensional memory, and said third memory includes said data reduction function having only one variable.

8. The data memory means according to claim 3, wherein said first memory means includes said dispersion function and the inverse function thereof, each of which has two variables, said second memory means includes a two-dimensional memory, and said third memory includes said data reduction function having two variables.

9. The data memory means according to claim 3, wherein said second memory means includes further:
   (4) fourth memory means for storing said dispersed data as they are without applying said data reduction functions.

10. The data memory means according to claim 1, wherein said first memory means includes said dispersion function and the inverse function thereof, each of which has only one variable, and said second memory means includes a one-dimensional memory.

11. The data memory means according to claim 1, wherein said first memory means includes said dispersion function and the inverse function thereof, each of which has two variables, and said second memory means includes a two-dimensional memory.

12. A data storing method for storing input data subjected to dispersion processing comprising:
   (a) a step of reading out a dispersion function from a first memory device for storing one or a plurality of dispersion functions and inverse functions of said dispersion functions;
   (b) a dispersion processing step of executing a convolution operation on the input data with the dispersion function thus read out to obtain dispersed data;
   (c) a step of storing the dispersed data obtained as the result of said dispersion processing in a second memory device;
   (d) a step of retrieving said dispersed data stored in said second memory device in response to a demand for a retrieval;
   (e) a step of reading out an inverse function of said dispersion function corresponding to said dispersed data retrieved from said first memory device; and,
   (f) a step of restoring said input data from said dispersed data by executing a convolution operation on said dispersed data with said inverse function read out.

13. The data storing method according to claim 12, wherein said step of reading out one of said dispersion functions comprises a step of selecting dispersion functions which are present in orthogonal relation to each other and were used for forming said dispersed data stored adjacent to each other.

14. The data storing method according to claim 13, wherein said step of storing data in said second memory device comprises:
   (1) a step of counting the number of retrievals of said dispersed data already stored; and
   (2) a step of reducing the data amount of said dispersed data by using a data reduction function for every predetermined number of retrievals.

15. The data storing method according to claim 14, wherein said step of reducing the data amount includes a step of executing a multiplying processing for multiplying said dispersed data by said data reduction function.

16. A data storing method for storing data subjected to dispersion processing comprising:
   (a) a step of reading out one of dispersion functions from a first memory device for storing one or a plurality of said dispersion functions and inverse functions of said dispersion functions;
   (b) a dispersion processing step of executing a convolution operation on the input data with the dispersion function thus read out; and
   (c) a step of storing the dispersed data obtained as the result of said operation in a second memory device.

17. The data storing method according to claim 16, wherein said step of storing data in said second memory device comprises:
   (1) a step of counting the number of retrievals of said dispersed data already stored; and
   (2) a step of reducing the data amount of said dispersed data by using a data reduction function for every predetermined number of retrievals.

18. The data storing method according to claim 17, wherein said step of reducing the data amount includes a step of executing a multiplying processing for multiplying said dispersed data by said data reduction function.

19. The data storing method according to claim 16, further comprising:
   a step of retrieving said dispersed data stored in said second memory device, responding to a demand for a retrieval;
   a step of reading out an inverse function of a dispersion function corresponding to said dispersed data retrieved from said first memory device; and,
   a step of restoring said input data from said dispersed data by executing a convolution operation of said dispersed data with said inverse function read out.

20. The data storing method of claim 16, wherein said step of reading out one of dispersion functions comprises a step of selecting dispersion functions which are present in orthogonal relation to each other and were used for forming said dispersed data stored adjacent to each other.

21. A method of dispersing, storing and restoring retrieval of an input data in a memory device having a memory portion comprised of a plurality of memory cells, including steps of:
   convoluting the input data with a preselected convolution function to obtain a data dispersion corresponding to the input data;
   selecting a set of the plurality of memory cells wherein the set is sized to store the data dispersion;
   storing the data dispersion in the set;
   retrieving the data dispersion upon demand; and,
   processing the data dispersion with an inverse function of the preselected convolution function to obtain a restored retrieval form of the input data.

22. The method of claim 21 further including enlarging available areas of the memory portion for storing new dispersed data comprising applying a reducing function to stored dispersed data for reducing a number of the memory cells of the set that collectively store a large amount of the stored dispersed data whereby the new dispersed data can be stored in memory cells made available by the reducing.

23. The method of claim 22 wherein the applying the reducing function is determined for stored dispersion data having a relatively infrequent retrieval occurrence.

24. The method of claim 21 wherein the selecting includes identifying the set so that adjacent storage of first and second dispersed data overlap in edge portions and wherein small amounts of the dispersed data are stored in memory cells of the edge portions.

* * * * *

UNITED STATES PATENT AND TRADEMARK OFFICE
CERTIFICATE OF CORRECTION

PATENT NO. : 5,193,173
DATED : March 9, 1993
INVENTOR(S) : Yoichi Seto It is certified that error appears in the above-identified patent and that said Letters Patent is hereby corrected as shown below:

Claim 1, column 9, line 44, delete "at a" and substitute therefor --data--.

Claim 16, column 11, line 26, delete "on the" and substitute therefor --of--.

Claim 16, column 11, line 28, delete the second occurrence of "the" and substitute therefor --a--.

Signed and Sealed this

Sixteenth Day of November, 1993

Attest:

BRUCE LEHMAN

*Attesting Officer*     *Commissioner of Patents and Trademarks*